United States Patent [19]

Strother

[11] 4,233,501
[45] Nov. 11, 1980

[54] INTERFERENCE SUPPRESSION FOR IMAGING OPTICAL SYSTEMS

[75] Inventor: John A. Strother, Princeton, N.J.

[73] Assignee: RCA Corporation, New York, N.Y.

[21] Appl. No.: 926,085

[22] Filed: Jul. 19, 1978

[51] Int. Cl.² .................................................. G01J 1/20
[52] U.S. Cl. .................................. 250/203 R; 250/216
[58] Field of Search ...................... 250/203, 216, 342; 350/354

[56] References Cited
U.S. PATENT DOCUMENTS 3,204,100  8/1965  Wormser et al.
3,418,478  12/1968  Falbel Primary Examiner—David C. Nelms
Assistant Examiner—Darwin R. Hostetter
Attorney, Agent, or Firm—Samuel Cohen; Joseph D. Lazar; Robert L. Troike

[57] ABSTRACT

Apparatus for sun-interference suppression in optical imaging systems reduces the light flux density in the image of the sun in comparison to the light flux density of the scene image, thereby reducing the area of the scene image that is dominated by the sun. An illustrative reduction of 27:1 of the light flux density of the image of the sun compared to the light flux density of the image of the scene is accomplished by three filters formed of photochromic material positioned along the optical axis of the sun-interferences suppression apparatus behind an image-forming lens. The lens focuses the sunlight into a converging cone; the convergence of the cone of sunlight between photochromic filters provides intensification which enhances the darkening of subsequent photochromic filters. The positioning of the photochromic filters allows only the scene image within two (2) degrees of the center of the sun to be affected by the darkened photochromic glass.

6 Claims, 3 Drawing Figures

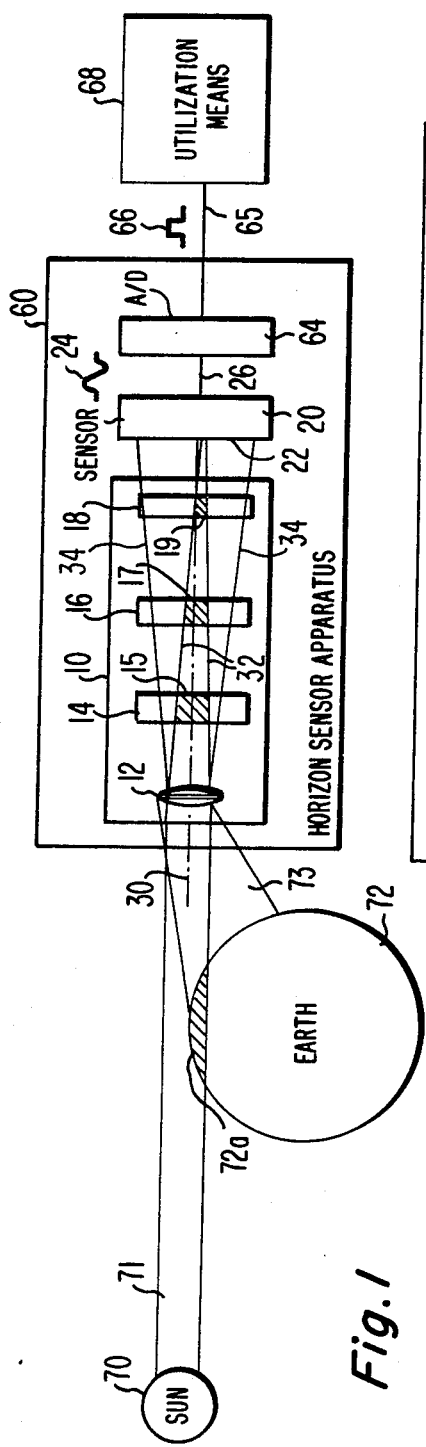
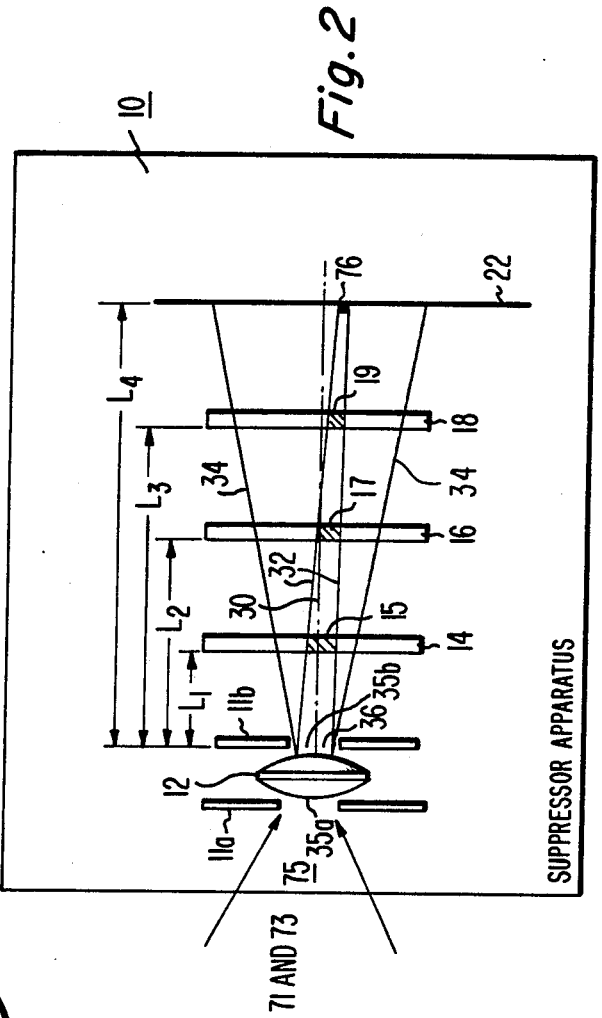

INTERFERENCE SUPPRESSION FOR IMAGING OPTICAL SYSTEMS

BACKGROUND OF THE INVENTION

1. Field of the Invention

This invention relates to a sun-interference suppression apparatus for optical imaging systems.

2. Description of the Prior Art

Optical and infrared detectors that operate by viewing or sensing a particular segment of the electromagnetic spectrum, must at times operate in the presence of extensive backgrounds of illuminated or radiated intensity, such as sunlight. The extensive background of the sun may be such that a detector may not distinguish the desired electromagnetic spectrum from the sunlit background.

Electronic means may be employed to reduce the background interference of the sun. A system that uses such electronic means is described in U.S. Pat. No. 3,204,100 entitled "Infrared Radiometer with Background Illumination", by Eric M. Wormser, et al., issued Aug. 31, 1965.

A system that uses optical means, such as an upper and lower field-of-view, in conjunction with electronic means to discern the effect of the sunlit background when viewing the horizon of the earth is described in U.S. Pat. No. 3,418,478 entitled "Horizon Sensor Using Two Stationary Fields of View Separated by a Fixed Elevation Angle which are Alternately Sampled," by Gerald Falbel, issued Dec. 24, 1968.

Neither of the aforementioned systems are able to suppress interference of the sunlit background with only optical means.

SUMMARY OF THE INVENTION

According to the invention, an optical imaging apparatus is provided for selectively reducing by a predetermined amount the flux density of radiation in the visible, near ultraviolet and near infrared portions of the electromagnetic spectrum from a relatively small very bright object within a larger scene that is less bright. The apparatus has an image-producing lens for imaging radiating objects into an image plane having an exit pupil to receive and pass radiation. The exit pupil has an aperture diameter that is greater than the diameter of the image of the very bright object as it appears in the image plane. The very bright object and the larger scene are focused at the image plane of the optical imaging system. Optical filters responsive to a predetermined level of flux density in the visible and near ultraviolet portions of the electromagnetic spectrum reduce in the portion only of the filter element exposed to the predetermined level of light the flux density of radiation of the very bright object.

BRIEF DESCRIPTION OF THE DRAWING

FIG. 1 is a block schematic illustrating the sun-interference suppression apparatus of the invention in a horizon sensor.

FIG. 2 is a detailed schematic of the sun-interference suppression apparatus.

DESCRIPTION OF THE PREFERRED EMBODIMENT

Figure 3:
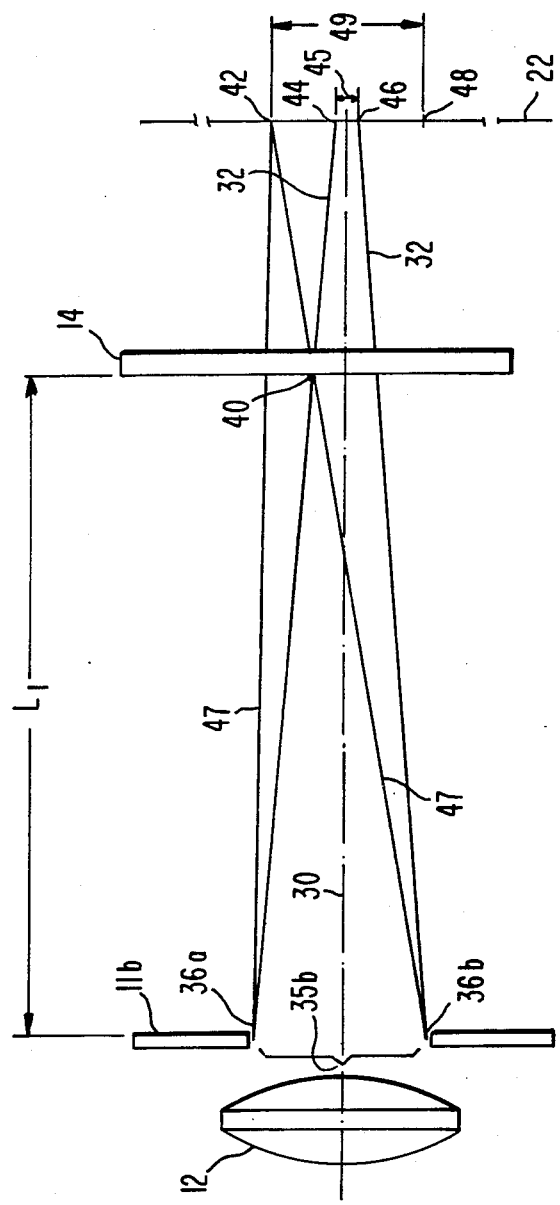
FIG. 3 is an enlarged view illustrating the details for placement of filter 14.

The sun-interference suppression apparatus to be described partially suppresses sun-interference when the sun is in the field of view of the optical imaging system. One such optical imaging system useful in practicing the invention is a horizon sensor apparatus shown in block diagram form in FIG. 1.

Horizon sensor apparatus 60 shown in FIG. 1 may be installed in a satellite (not shown) which in one embodiment is in a geosynchronous orbit. Apparatus 60 is positioned to view optically the horizon of the earth in the visible and near ultraviolet electromagnetic spectrum. The practice of the present invention requires that the horizon sensor respond to the visible and near ultraviolet electromagnetic radiation rather than the infrared radiation in the $CO_2$ spectrum.

The horizon sensor generates attitude signals used by known satellite utilization means 68 for determination of the attitude of the satellite in a manner well known in the art. Determination of attitude by the utilization means 68 is not part of this invention and therefore need not be discussed further.

Horizon sensor apparatus 60 comprises a sun-interference suppression apparatus 10, a sensor 20 of photosensitive material and an analog-to-digital converter 64. The sensor 20 may be a television pickup camera such as a charge coupled device camera or any other conventional type sensor. The sensor 20 converts the incident light of the scene (73) and sun (71) into an analog video signal 24 and then transmits this signal 24 to analog-to-digital converter 64 via signal path 26. The analog-to-digital converter 64 converts analog signal 24 to a digital signal 66 and transmits signal 66 to utilization means 68 via signal path 65.

Sun 70 appearing in the background in the field of view of horizon sensor apparatus 60 is a high flux density source having a small angular extent. Conversely, scene 72, for example, the earth, appearing in the field of view of sensor apparatus 60 is a low flux density diffused source. The term flux density as used herein shall mean the light flux per unit area passing through a particular station (lens or filter) or impinging on a particular surface of the system. The unit of flux density measurement in the cgs system is lumens per square centimeter.

Horizon sensor apparatus 60 at times has both the sun 70 and the scene 72 particularly the horizon of the earth in its field of view. However, it is desired to examine only the earth 72. The incident flux density of the sun 70 is at such a higher level than the incident flux density of the earth that the horizon sensor 60 may not be able to distinguish the image of the scene from the extensive sunlit background. Therefore, when the sun is in the field of view of the horizon sensor 60, it is necessary to suppress the effect of the sun 70 (portion 72a, for example) on the horizon sensor 60 in order to view the earth 72 and to determine the horizon with accuracy. This is accomplished by the sun-interference suppression apparatus 10 shown in detail in FIG. 2. The suppression apparatus 10 includes an entrance diaphragm 11a, lens 12, an exit diaphragm 11b, three photochromic glasses 14, 16, and 18 and the image plane 22 of the sensor 20.

Sun 70 is a small source having high flux density which accordingly appears as a small image to lens 12. Lens 12 is a converging lens, suitably a convex lens, e.g., a double convex lens of focal length 22 millimeters supported in a suitable holder at the optical entrance area 75 of the sunlight 71 and scene light 73. Diaphragm 11a includes a circular aperture defining the entrance pupil 35a to limit the amount of light that is passed through lens 12. The field of view is defined by that portion of the image plane 22 occupied by the active portion of the sensor 20. Lens 12 in conjunction with exit pupil 35b focuses sunlight 71 into a converging cone 32. Exit pupil 35b having a diameter 36 is large enough to provide a passage for sunlight 71 allowing the parallel rays of sunlight 71 to be focused into a converging cone 32.

The flux density of the incoming light increases as the converging cone 32 approaches and converges at the image plane 22, the flux density increasing as a function of the square of the distance traveled from exit pupil 35b to image plane 22.

Scene of earth 72 is a diffused source which appears as a large image to lens 12 as compared to the sun 70. Correspondingly, the flux density received at the lens 20 from the earth 72 is small as compared to the high flux density received from the sun. The average flux density from the earth decreases as a function of the square of the distance traveled from exit pupil 35b to image plane 22. According to the present invention, the sunlight 70 is suppressed without significantly suppressing the light of the earth 72.

According to the principle of the present invention, the convergence and the consequent intensification of the relatively high flux density of sunlight is dependent upon the diameter of the exit pupil 35b being greater than the diameter of the image of the sun at image plane 22. Furthermore, the diameter of exit pupil 35b should be great enough to pass a sufficient quantity of light flux from the desired scene, in the present embodiment, the earth 72, to satisfy the requirements of the imaging function being performed, in the requirements of the imaging function being performed, in the present embodiment, the horizon sensing function.

Converging cone 32 of the image of the sun 70 and the diverging cone 34 of the image of the earth 72 both pass through filters 14, 16, and 18 from exit pupil 35b to image plane 22. As will be explained, the converging cone 32 of light serves to darken the corresponding portion of filters 14, 16, and 18 for consequent reduction of the flux density of the image of the sun without darkening or otherwise affecting the remaining portion of the filters 14, 16, and 18. Thus, the diverging cone 34 of light of the image of the earth 72 will pass through the filters 14, 16, and 18 without causing a photochromic effect as will be explained.

Each filter 14, 16, and 18 is a glass element comprising photochromic material. Each element has outer surfaces that are plane and parallel. Photochromic filters 14, 16, and 18 have the characteristic property of darkening when exposed to light of a sufficient intensity (to be explained later) for a predetermined amount of time, e.g., two (2) minutes. The photochromic filters 14, 16, and 18 respond to radiation in the visible and near ultraviolet portions of the electromagnetic spectrum by darkening. Darkened photochromic filters 14, 16, and 18 attenuate radiation not only in the visible and near ultraviolet spectra but also to some degree in the near infrared spectrum. One such type of photochromic filter having a thickness of two (2) millimeters that may be used in the practice of the invention is a commercially available glass manufactured by the Corning Glass Works, under the trade-name "Photo-Sun."

The darkened portions 15, 17, and 19 of filters 14, 16, and 18, respectively, are darkened after exposure to the converging cone 32 of sunlight for approximately two minutes defining the minimum start-up time to render the system operative for this type of photochromic glass. Each of the filters 14, 16, and 18 has respective transmission values of approximately 0.75 and approximately 0.25, that is, each photochromic filter transmits approximately 0.75 of the light it receives when undarkened and approximately 0.25 of the light it receives when darkened.

Darkened portions 15, 17, and 19 reduce the flux density of all the light within the converging cone 32, including radiation that is common to both the small very bright object, the sun, and the larger scene being viewed, the earth. Since the sunlight is within the cone 32, the sunlight will be substantially suppressed and incidentally reduced by the lens (12) action. Furthermore, the portion of earth light 72 which is intercepted by the filter portions of the darkened mode (0.25) will also be suppressed. But, it is noted, only a relatively small portion of the earth image is suppressed. Filters 14, 16, and 18 are positioned such that no portion of the earth's image more than two degrees (2°) from the center of the sun image is affected by the darkening effect of the respective photochromic filters 14, 16, or 18. The manner of positioning the photochromic filters 14, 16, and 18 will be described in further detail.

The invention in the embodiment illustrated provides for a sun-interference apparatus having a relative reduction of the flux density of the image of the sun to the image of the earth of 27:1. Furthermore, as previously discussed, although the invention in the embodiment illustrated provides for the flux density of the earth image, that is, within two degrees of the center of the image of the sun to be partially reduced by the darkened photochromic filters, it should be understood that the reduction ratio of 27:1 and the 2° vignette-like effect of the earth image are used in one typical optical imaging system. Other optical imaging systems may have different requirements for the radiation interference suppression apparatus.

The positioning of filters 14, 16, and 18 in the sun-interference suppression apparatus will now be discussed in detail. The three filters 14, 16, and 18 are at distances L1, L2, L3, respectively from exit pupil 35b whose diameter 36 is generally diameter $D_1$. The image plane 22 is at a distance $L_4$ from exit pupil 35b, distance $L_4$ being substantially the focal length of the sun-interference suppression subsystem 10.

The following equations (1)–(11) based on well known principles of optics will provide the basis for understanding how the photochromic filters 14, 16, and 18 are positioned in the sun-interference suppression subsystem 10.

The diameter of the cone of sunlight leaving lens 12 in this environment is equal to the diameter of aperture 35b. The diameter of the converging cone 32 of sunlight at the image plane 22 is equal to the angular subtense of the sun, which is approximately 0.5°, multiplied by the focal length $L_4$. The diameter of the converging cone of sunlight 32 at image plane 22 is expressed as $D_2$ and is computed by the following relation:

$$D_2 = \frac{(0.5°)(\pi)}{180°} \cdot (L_4) \qquad (1)$$

The diameter (d) of converging cone 32 at distance X from exit pupil 35b is expressed by the following equation:

$$d = D_1 - (D_1 - D_2) \cdot \left(\frac{X}{L_4}\right) \quad (2)$$

Substituting equation (1) for the value $D_2$ of equation (2), results in:

$$d = \left(D_1 - \frac{D_1 X}{L_4}\right) + \left(\frac{(0.5°)(\pi)}{180°}(X)\right) \quad (3)$$

The flux density of the scene (earth) image ($I_{SI}$) at the image plane 22 (neglecting the attenuation of the photochromic glasses) is given by the following equation.

$$(4)$$

$$I_{SI} = \frac{(B) \cdot (T_L)}{4 \, (f/\text{number})^2}$$

where B = scene luminous emittance in foot lamberts.
$T_L$ = transmission ratio of lens 12.
$I_{SI}$ = image plane flux density in foot candles.
f/number = focal ratio.

The focal ratio, sometimes referred to as the relative aperture of a lens, is equal to the ratio of the diameter $D_1$ of exit pupil 35b to the focal length ($L_4$) of the sun-interference suppression apparatus 10. As previously stated, the focal length is substantially equal to $L_4$. This value of focal length $L_4$ is valid for a good approximation for a lens such as lens 12 which is thin. The value of f/number is given by the following relation:

$$f/\text{number} = \frac{L_4}{D_1} \quad (5)$$

As previously discussed, the flux density of diverging cone 34 of the image of the earth 72 decreases by a factor of the square of the distance.

If the earth image (or the sensor 20 active area, whichever is smaller) at image plane 22 has a diameter $D_4$, the flux density $I_x$ due to the earth image (or due to the portion of the image intercepted by the sensor 20 active area) at any distance X behind lens 12 is derived from the following equations 6-11.

$$I_{SI} = \frac{B \, T_L}{4 \left(\frac{L_4}{D_1}\right)^2} \quad (6)$$

Total flux $T_F$ in earth image (or in portion of earth image intercepted by the sensor 20 active area) at image plane 22 is given by the following equation:

$$T_F = I_{SI} \cdot \frac{\pi}{4} D_4^2 \quad (7)$$

Flux density $I_x$ due to total flux $T_F$ at any station X is given by the following equation:

$$I_X = \frac{\text{Total flux } T_F}{\text{Cone cross section area at station } X} \quad (8)$$

The cone cross section area $C_{AX}$ at station X is given by the following equation:

$$C_{AX} = \frac{\pi}{4} \text{ (cone diameter at station } X)^2 \quad (9)$$

Cone diameter $C_{DX}$ at station X is given by the following equation:

$$C_{DX} = D_1 + \frac{X}{L_4}(D_4 - D_1) \quad (10)$$

Therefore, by using equations 6 through 10, the flux density $I_X$ at any station X is given by the following equation:

$$I_X = \frac{B \, T_L}{4\left(\frac{L_4}{D_1}\right)^2 \left[\frac{D_1^2}{D_4^2} + \frac{X^2}{L_4^2}\left(1 - \frac{D_1}{D_4}\right)^2 + 2\frac{D_1}{D_4} \cdot \frac{X}{L_4}\left(1 - \frac{D_1}{D_4}\right)\right]} \quad (11)$$

In order to design for the required filter placement, the amount of flux density needed to darken fully a photochromic filter must be known, and, further, the threshold of flux density which does not darken the photochromic filter at all must be known. Corning "Photo-Sun" glass of a 2 millimeter thickness, previously given as an example of a photochromic glass, requires a flux density of 10,000 foot-candles incident light to be fully darkened and further requires flux density of less than 100 foot-candles not to darken at all. In addition, once these characteristics of the photochomic glass are known, the correct placement of photochromic filter 14 further requires knowledge of the arriving flux density from the sun 70 and the earth 72. The arriving flux density from the sun, outside the atmosphere, is approximately 13,000 foot-candles. The typical scene of the earth may have an average luminous emittance outside the atmosphere, of approximately 1,500 foot-lamberts.

Using equation (11) with the values of $D_1 = 1.0$; $B = 1,500$; $D_4 = \infty$; f/number = 22; $T_L = 0.8$; $L_4 = 22$; $I_X = 100$ foot-candles (threshold of the flux density that does not darken photochromic filter 14) and solving for X, results in a distance X of the placement of photochromic filter 14 from the exit pupil 35b of 1.73 mm. However, the requirement that only the earth image within 2° from the center of the sun's image be effected by the darkening of the photochromic filter 14 will not be satisfied by the distance of 1.73 mm. The placement of 1.73 mm will intercept the converging cone 32 of sunlight to cause sun-induced darkening of portion 15 of filter element 14 such that a scene area of more than 2° from the center of the sun will intercept portion 15 and be effected by the low transmission value (0.25) of photochromic filter 14. The position of the photochromic filter 14 to satisfy the 2° requirement is 13.16 mm from exit pupil 35b.

To explain the position of 13.16 mm, the changing diameter of diverging cone 34 of the earth image from exit pupil 35a to image plane 22 is first discussed. The diameter of diverging cone 34 increases linearly from exit pupil 35b to image plane 22. Consequently, the radius of the scene image at image plane 22 optical axis 30 that is within 2 degrees of the center of the sun may be determined using the following equation, similar to equation (1), with values of 2° for scene image half-angle and 22 mm for $L_4$:

$$R_3 = \frac{(2°)(\pi)}{180}(L_4) \quad (12)$$

$$= \frac{(2°)(\pi)(22)}{180}$$

$$= 0.768 \text{ mm}$$

If the sun is on the optical axis 30 of the system 60, the image area that it is desired to be protected from all partial attenuation by the darkened portions of the filters 14, 16, and 18 consist of all portions of the image plane 22 that are located 2° or more from center, that is, the point where the optical axis 30 and the center of the sun image intercept the image plane 22. To visualize the geometric conditions that must be met to protect this outer image area from all darkening effects of the filters 14, 16, and 18, reference is now made to FIG. 3.

The converging cone of sunlight 32 emitted from the exit pupil $35_b$, between points $36_a$ and $36_b$ focuses on image plane 22 at a diameter 45. Diameter 45 is bounded by points 44 and 46 at image plane 22. The upper boundary point of the image area which is to be protected from all partial attenuation of the filters 14, 16, and 18 is shown as point 42. The lower boundary point, which is to be protected from all partial attenuation of filters 14, 16, and 18 is shown as point 48. The distance between points 42 and 48, at image plane 22, is shown as diameter 49. Diameter 49 is a scene-image area within which partial darkening is permissible. Diameter 49 spanning points 42 and 48, which are 2° radii points from the center of the sun, covers a total distance of 4° referenced to the center of the sun. The scene image above point 42 and below point 48 is protected from all partial attenuation by the darkened portions of filters 14, 16, and 18. The critical crossover location for the cone of sunlight 32 and the cone of illumination 47 that defines the boundary between the protected scene areas is shown as point 40.

The critical ray crossover location 40 occurs where the bottommost ray illuminating the protected area, that is above point 42, intercepts the topmost ray of the cone of the converging sunlight 32. If the filter 14 were placed forward of location 40, that is closer to the lens 12, some of the rays which illuminate the scene area that is desired to be protected from darkening would pass through the darkened portions of the filter 14. Therefore, the distance $L_1$ for the filter 14 from the lens 12 must be at least as great as that of the critical intersection point 40. As previously stated, the required distance $L_1$ in the specific embodiment described herein is 13.16 mm from exit pupil $35_b$. The 13.16 mm value of $L_1$ is derived from the following equations 13 through 15.

The height, $h_1$, of the bottommost ray to be protected, relative to the optical axis 30, is given by the following equation:

$$h_1 = -\frac{D_1}{2} + \frac{X}{L_4}\left(\frac{D_1}{2} + 0.768 \text{ mm}\right) \quad (13)$$

where 0.768 mm is the 2° radius of the boundary of the area to be protected, above optical axis 30, and has been previously derived by equation (12).

The height, $h_2$, of the topmost ray of sunlight 32 above the optical axis 30 is given by the following equation:

$$h_2 = \frac{D_1}{2} - \frac{X}{L_4}\left(\frac{D_1}{2} - 0.096 \text{ mm}\right) \quad (14)$$

where 0.096 mm is the 0.25° radius of the converging cone of sunlight at image plane 22 above optical axis 30 and derived in a similar manner as equation (12) except the 2° value of equation (12) is replaced with a 0.25° value.

Equations 13 and 14 for the two height expressions are equated to one another from which the X value 13.16 for $L_1$ is derived as follows using the values of:

$$\frac{D_1}{2} = 0.5 \text{ mm and } L_4 = 22.0 \text{ mm;} \quad (15)$$

Equation 13 = Equation 14

$$-0.5 + \frac{X}{22}(0.5 + 0.768) = 0.5 - \frac{X}{22}(0.5 - 0.096)$$

$$\frac{X}{22}(0.5 + 0.768 + 0.5 - 0.096) = 0.5 + 0.5$$

$$X = \frac{22}{1.672} = 13.16 \text{ mm}$$

$L_1$, the distance from lens 12 of the first photochromic filter 14, must therefore be greater than or equal to 13.16 millimeters in the illustrated embodiment in order that no image more than 2° from the center of the image of the sun be affected by darkening of any of the photochromic filters 14, 16, and 18.

At the distance of 13.16 mm the flux density of scene image impinging photochromic filter 14 is well below 100 foot-candles. The 100 foot-candle value has been previously determined for a 1.73 mm placement and as has been explained the flux density of the image of the scene decreases as the square of the distance traveled. Therefore, for all values greater than 1.73 mm, the flux density is less than 100 foot-candles. Still further, the flux density of less than 100 foot-candles of the image of scene at distances greater than 1.73 mm does not darken photochromic filters 14, 16, and 18.

The flux density of the image of the scene entering the sun-interference suppression apparatus 10 at entrance pupil $35a$ and passing through lens 12, photochromic filters 14, 16, and 18 for collection at image plane 22 is reduced by the 0.8 transmission ratio ($T_L$) of lens 12 and the transmission ratio 0.75 of each of the undarkened areas of photochromic glasses 14, 16, and 18. Therefore the total reduction of the flux density of the image of the scene $TA_{SI}$ by the sun-interference suppression apparatus 10 is determined by first giving the symbols $T_L$ for lens 12 transmission ratio and $T_{pc}$ for the undarkened photochromic filters 14, 16, and 18 transmission ratio and then substituting the approriate values in the following equation:

$$TA_{SI} = T_L \cdot T_{pc} \cdot T_{pc} \cdot T_{pc} \quad (16)$$

$$= (0.8) \cdot (0.75) \cdot (0.75) \cdot (0.75)$$

$$= 0.3375$$

The flux density of the image of the scene at the image plane 22 is determined using equation (4) and substituting $TA_{SI}$ for $T_L$ as follows:

$$I_{SI} = \frac{(B)(TA_{SI})}{4(f/\text{number})^2} \quad (17)$$

$$= \frac{(1500 \text{ ft-lamberts})(0.3375)}{(4)(22)^2}$$

$$= 0.26 \text{ ft-candles}$$

In order to obtain the desired 27:1 reduction ratio of the image of the sun to the image of the earth scene, the placement of photochromic filters 16 and 18 must be such that the sunlight as it intercepts filters 16 and 18 has a flux density of $\approx 10{,}000$ foot-candles in order to darken fully filters 16 and 18. To determine the placement of photochromic filters 16 and 18, the flux density of the converging cone 32 of sunlight as it passes through the sun-interference apparatus 10 needs further discussion.

At photochromic glass 14, the flux density of the arriving sunlight 71 is obtained by multiplying the flux density of the sunlight emitted from exit pupil 35b by the ratio of the diameter of the exit pupil 35b to the diameter of the darkened portion 15. The flux density of the image of the sun ($I_{SNI}$) impinging photochromic filter 14 is determined by first using equation (3) to obtain the diameter of the sun image at the photochromic filter 14, then multiplying the flux density of the sun emitted from exit pupil 35b by the square of the ratio between the diameter of exit pupil 35b and the diameter of the image of the sun at photochromic filter 14. The diameter of the image of the sun at photochromic filter 14 is determined as follows with a value of $X = 13.16$ mm:

$$d_2 = D_1 - \frac{D_1 X}{L_4} + \frac{(0.5°)(\pi)}{180°}(X) \quad (18)$$

$$= 1.0 - \frac{(1.0)(13.16)}{22} + \left(\frac{(0.5)(\pi)}{180}\right)(13.16)$$

$$= 0.516 \text{ mm}$$

The flux density of the image of the sun ($I_{SNI}$) impinging the photochromic glass 14 ($I_{SNI}$) is now determined using the value of 0.516 for $d_2$, obtained from equation (18) and $D_1 = 1.0$ mm, $T_L = 0.8$, and flux density F of the sun = 13,000 foot-candles as follows:

$$I_{SNI} = (F)(T_L)\left(\frac{D_1}{D_2}\right)^2 \quad (19)$$

$$= (13{,}000)(0.8)\left(\frac{1.0}{.516}\right)^2$$

$$= 39{,}060 \text{ ft-candles}$$

After flux density reduction by the darkened area 15 of photochromic filter 14, the flux density of the sun leaving the photochromic filter 14 lowers to a value of 39,060 ft-candles multiplied by 0.25 which is equal to 9.765 ft-candles. Only a small amount of additional path length is required for the converging cone of sunlight for the focusing action by lens 12 of the sun suppression system to increase the flux density of the image of sun up to $\approx 10{,}000$ foot-candles that is further required for darkening the photochromic filters 16 and 18. The following values of the placement of filters 16 and 18 do not represent the mathematical optimization of the desired positions for the maximum reduction of the flux density of the image of the sun. However, the following values are representative of the positions of filters 16 and 18 to provide for the 27:1 reduction of the flux density of the image of sun compared to the flux density of the image of the scene:

$L_2$ (placement of photochromic filter 16) = 16.0 mm
$L_3$ (placement of photochromic filter 18) = 20.0 mm.

The flux density of the sunlight impinging on photochromic glass 16 is determined using equations 18 and 19 and a value of 16.0 mm for X and results in a value of 15,169 foot-candles. The flux density transmitted from photochromic filter is 15,169 foot-candles multiplied by 0.25 which equals 3,792 foot-candles.

Using the value of 20 mm for $L_3$ and equations 18 and 19, the flux density impinging photochromic filter 18 is 9,302 foot-candles which is sufficient to fully darken photochromic filter 18 even though not quite reaching the 10,000 foot-candle characteristic of the photochromic filter 18. Thus, it has been shown that the converging zone 32 of sunlight is of a sufficient flux density to darken photochromic filters 14, 16, and 18.

The sun-interference suppression apparatus reduces the flux density of the converging cone 32 of sunlight by the darkening portions of photochromic filters 14, 16, and 18 each having a transmission ratio of 0.25. Therefore, the flux density of converging cone 32 is reduced by a factor of $(0.25)^3$. The flux density of the diverging cone 34 of the scene outside the 2° central area of the sun is conversely reduced only by the undarkened portions of photochromic filters 14, 16, and 18 each having a transmission ratio of 0.75. Therefore, the flux density of diverging cone 34 is reduced by a factor of $(0.75)^3$. Thus, the relative reduction of flux density of the sun to the flux density of the scene is $(0.75^3)/(0.25)^3 = 27:1$.

It should be appreciated that although the embodiment of the invention is an exemplary use of three photochromic filters 14, 16, and 18 appropriately positioned to obtain a 27:1 ratio of reduction of the flux density of the image of the sun to the flux density of the image of the scene, one or more photochromic filters may be used to achieve a reduction ratio within the guidelines set forth hereinabove.

It should be further appreciated that the embodiment of the present invention described herein is a sun-interference suppression apparatus for use in a horizon sensor in an orbiting satellite. However, the invention may be used in other types of optical imaging systems that are required to distinguish scene objects at ordinary brightness levels, according to the design of the system, even when high intensity sources are present in the field of view. Such an imaging optical system may be a security monitor having a predetermined viewing area. If in such a system, a high intensity source, such as a spotlight or flashlight, enters the field-of-view, the described invention will partially suppress the high intensity source allowing the security monitor to continue to distinguish the scene objects. The invention is also useful with other sensors that operate in the visual or ultraviolet spectra.

What is claimed is:

1. An optical imaging apparatus for selectively reducing by a predetermined amount the flux density of radiation in the visible, near-ultraviolet and near-infrared portions of the electromagnetic spectrum from a relatively small very bright object within a larger scene that is less bright, comprising:
   a. lens means for imaging radiating objects into an image plane, said lens means having an exit pupil to receive and pass radiation, said exit pupil having an aperture diameter greater than the diameter of the image of said very bright object appearing in said image plane;
   b. radiation detecting means responsive to radiation passing through said lens means, said radiation detecting means being positioned at said image plane of said lens means; and
   c. filter means including one or more filter elements positioned between said image plane and said lens means responsive to a predetermined level of flux density in the visible and near-ultraviolet portions of the electromagnetic spectrum to reduce in the portion only of said filter element exposed to said predetermined level of light the flux density of radiation of said very bright object.

2. An apparatus according to claim 1 wherein said lens means comprises a double-convex lens.

3. An apparatus according to claim 1 wherein said lens means comprises a plano-convex lens.

4. An apparatus according to claim 1 wherein said filter elements are formed of photochromic material.

5. An apparatus according to claim 1 wherein each of said filter elements is positioned between said image plane and said exit pupil at a predetermined distance such that the proportion of the radiation of said larger scene that is reduced in flux density at each filter element is related to the total amount of radiation from said larger scene by a predetermined amount.

6. A method for selectively reducing by a predetermined amount the flux density of radiation in the visible, near-ultraviolet and near-infrared portions of the electromagnetic spectrum from a relatively small very bright object within a larger scene that is less bright, in an optical imaging apparatus having a lens with an exit pupil, radiation detecting means positioned at the image plane of said lens, comprising the steps of:
   a. convergently focusing the image of said small very bright object at said image plane;
   b. focusing the image of said larger scene at said image plane;
   c. reducing only the flux density of the common radiation of both of said very bright object and larger scene that it passes between said exit pupil and said image plane.

* * * * *